(12) United States Patent
Abdelsamie et al.

(10) Patent No.: US 8,964,364 B2
(45) Date of Patent: Feb. 24, 2015

(54) CARRYING CASE FOR CONTROLLING A MOBILE DEVICE

(71) Applicant: Research in Motion Limited, Waterloo (CA)

(72) Inventors: Ahmed Abdelsamie, Nepean (CA); Omar George Joseph Barake, Waterloo (CA); Alan James Deciantis, Kitchener (CA); Peter Mankowski, Waterloo (CA); Steven A. Lill, Waterloo (CA)

(73) Assignee: Blackberry Limited, Waterloo, Ontario (CA)

( * ) Notice: Subject to any disclaimer, the term of this patent is extended or adjusted under 35 U.S.C. 154(b) by 81 days.

(21) Appl. No.: 13/684,344

(22) Filed: Nov. 23, 2012

(65) Prior Publication Data

US 2014/0146464 A1     May 29, 2014

(51) Int. Cl.
*G06F 1/16*     (2006.01)
*A45C 11/00*    (2006.01)

(52) U.S. Cl.
CPC ............ *G06F 1/1628* (2013.01); *G06F 1/1632* (2013.01); *A45C 2011/002* (2013.01); *A45C 2011/003* (2013.01); *A45C 2200/15* (2013.01); *G06F 2200/1633* (2013.01)
USPC ............ 361/679.03; 361/679.41; 361/679.55; 361/679.56

(58) Field of Classification Search
CPC ... G06F 1/1628; G06F 1/1632; G06F 1/1633; A45C 2011/001; A45C 2011/002; A45C 2011/003
USPC ...................................................... 361/679.03
See application file for complete search history.

(56) References Cited

U.S. PATENT DOCUMENTS

| | | | | |
|---|---|---|---|---|
| 5,568,358 | A  * | 10/1996 | Nelson et al. | 361/679.3 |
| 6,789,771 | B1 | 9/2004 | Shick et al. | |
| 7,270,255 | B2 | 9/2007 | Badillo et al. | |
| 7,762,553 | B2 | 7/2010 | Harris | |
| 7,980,898 | B2 * | 7/2011 | Chatterjee | 439/660 |
| 8,531,833 | B2 * | 9/2013 | Diebel et al. | 361/679.56 |

(Continued)

FOREIGN PATENT DOCUMENTS

| | | |
|---|---|---|
| CA | 2739220 A1 | 11/2011 |
| CA | 2766362 A1 | 7/2012 |
| EP | 2059005 A2 | 5/2009 |

OTHER PUBLICATIONS

Corresponding PCT International Application No. PCT/CA/2013/000439 International Search Report dated Aug. 28, 2013.

(Continued)

*Primary Examiner* — Anthony Q Edwards
(74) *Attorney, Agent, or Firm* — Perry + Currier Inc.

(57) ABSTRACT

A carrying case for controlling a mobile device is provided, the carrying case comprising: a body enabled to mate with a mobile device to physically protect the mobile device; at least one input device, the body comprising the input device; a processor enabled to control communications with the mobile device; a power interface enabled to receive power from the mobile device to power the processor; and, a data interface enabled for relaying the communications between one or more of the at least one input device and the processor, and the mobile device, for controlling applications at the mobile device.

19 Claims, 11 Drawing Sheets

(56) References Cited

U.S. PATENT DOCUMENTS

| | | | |
|---|---|---|---|
| 2002/0099895 A1 | 7/2002 | Landron et al. | |
| 2007/0004450 A1* | 1/2007 | Parikh | 455/556.1 |
| 2008/0096620 A1* | 4/2008 | Lee et al. | 455/575.8 |
| 2008/0230987 A1 | 9/2008 | Jackson | |
| 2008/0251338 A1* | 10/2008 | Golden et al. | 190/100 |
| 2009/0073650 A1* | 3/2009 | Huang et al. | 361/679.56 |
| 2010/0081505 A1 | 4/2010 | Alten et al. | |
| 2011/0287808 A1 | 11/2011 | Huang | |
| 2012/0194448 A1 | 8/2012 | Rothkopf | |
| 2012/0262116 A1* | 10/2012 | Ferber et al. | 320/111 |
| 2012/0314354 A1* | 12/2012 | Rayner | 361/679.01 |
| 2013/0077235 A1* | 3/2013 | Pawar et al. | 361/679.56 |
| 2013/0107126 A1* | 5/2013 | Nonomura et al. | 348/725 |
| 2013/0154914 A1* | 6/2013 | Salo et al. | 345/156 |
| 2013/0235521 A1* | 9/2013 | Burch et al. | 361/679.48 |
| 2014/0110277 A1* | 4/2014 | Chen et al. | 206/45.23 |

OTHER PUBLICATIONS

Corresponding PCT International Application No. PCT/CA/2013/000439 Written Opinion of the International Searching Authority dated Aug. 28, 2013.

Corresponding European Patent Application No. 12194145.4 European Search Report dated Mar. 21, 2013.

* cited by examiner

CARRYING CASE FOR CONTROLLING A MOBILE DEVICE

FIELD

The specification relates generally to carrying cases, and specifically to a carrying case device for controlling a mobile device.

BACKGROUND

The evolution of computers is currently quite active in the mobile device environment. Controls for mobile devices can be difficult to operate, and/or have poor ergonomics especially for gaming environments.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
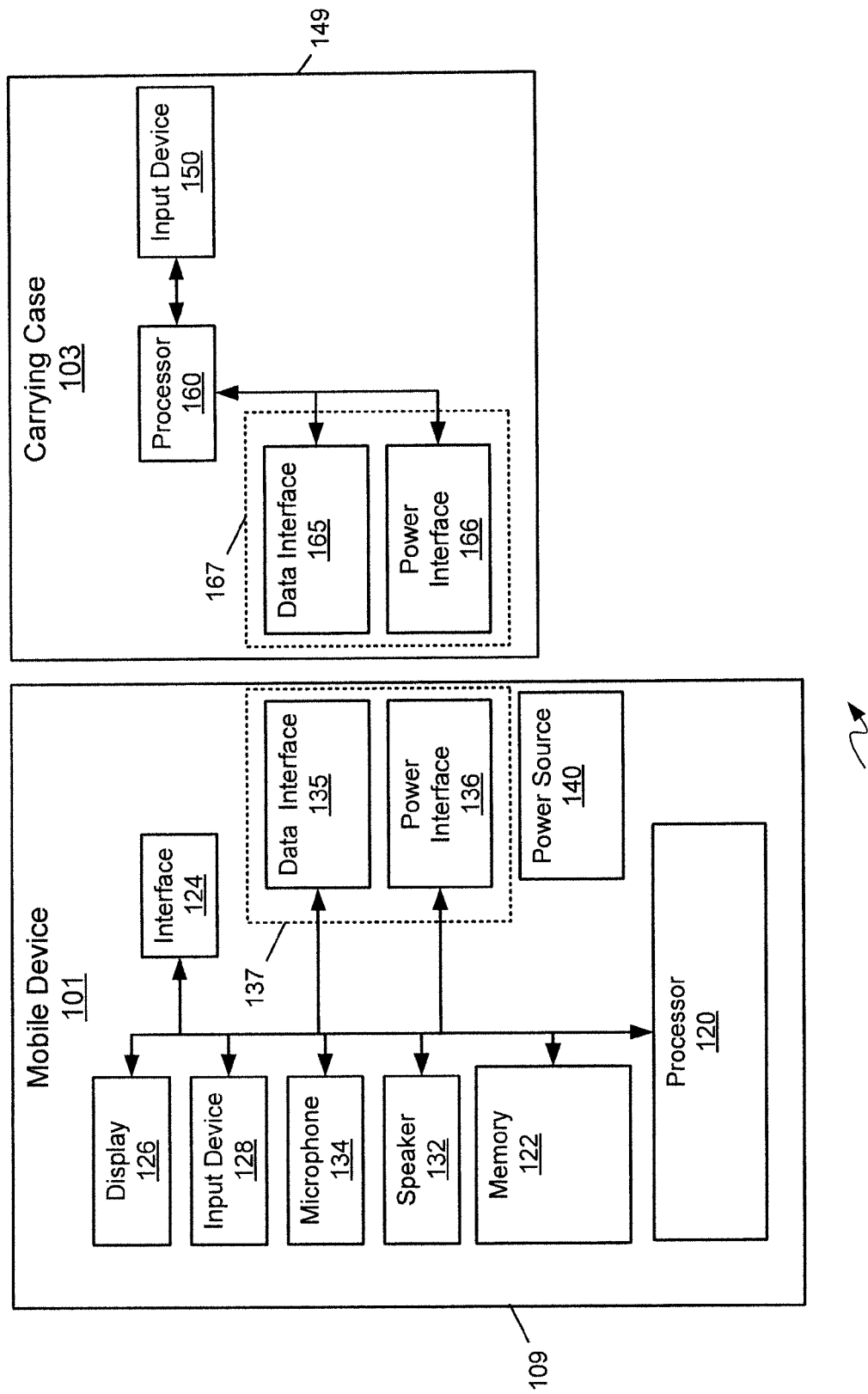
FIG. 1 depicts a schematic block diagram of a system including a carrying case for controlling a mobile device, according to non-limiting implementations.

In general, this specification is directed to a carrying case for controlling a mobile device. In general, mobile devices represent electronic devices that are readily movable from place to place. Carrying cases represent devices for carrying mobile devices from place to place, while physically protecting mobile devices, for example from scratches, impacts, contaminants, sunlight and the like. Applications can be processed at such mobile devices that require receipt of input data at an input device, including messaging applications, document composition applications, gaming applications and the like. While the problem is not limited to gaming applications, gaming applications can require rapid input at input devices; such rapid input can be difficult to receive at the limited controls on mobile devices. It can be very difficult to accurately control game play, for example, using a touch screen device, especially when there are multiple controls associated with the game, to be used in parallel with each other. Hence, this specification describes various implementations of a carrying case device that can be mated with a mobile device to control the mobile electronic device.

In this specification, elements may be described as "enabled to" perform one or more functions or "enabled for" such functions. In general, an element that is enabled to perform or enabled for performing a function is configured to perform the function, or is suitable for performing the function, or is adapted to perform the function, or is operable to perform the function, or is otherwise capable of performing the function.

Furthermore, as will become apparent, in this specification certain elements may be described as mated, coupled or connected physically, electronically, optically, communicatively, mechanically or any combination thereof, according to context. Hence, in this disclosure, "enabled to mate" refers to a communicative coupling and typically a physical coupling as well. In general, components that are communicatively coupled are configured to communicate (that is, they are capable of communicating) in any fashion for any duration, such as by way of electric signals, optical signals, wireless signals, or any combination thereof. The communication may be one-way or two-way communication. Components are "physically coupled" when they are attached or connected or joined to one another, in any fashion, whether releasably or substantially permanently, so that physical activity of one component generally affects the other. The physical attachment may be direct or by way of one or more intermediate elements. According to context, two components that are physically coupled may behave as a single element. In some cases, physically coupled elements may be integrally formed, e.g., part of a single-piece article that may share structures and materials. In other cases, physically coupled elements may comprise discrete components that may be fastened together in any fashion. Physical coupling may also include a combination of discrete components fastened together, and components fashioned as a single piece.

In addition, some elements are described herein as operating in a master mode and/or a slave mode. In the context of electronics and control apparatus, the "master" and "slave" terminology generally connotes a primary and secondary technological relationship—indeed, the words "primary" and "secondary" could generally be substituted for "master" and "slave"—and is not intended to carry any connotation with respect to human slavery. When there are two devices in a master-slave arrangement, the master device act in "master mode"—that is, as master—and the other device acts in slave mode. Generally speaking, a device in master mode can send control signals or instructions to a device in slave mode, or a device in slave mode may perform functions for or on behalf of a master device. Other functionality may also be enabled in a master-slave arrangement, for example: a slave device may be synchronized to a master device; and a master device may have an enhanced status with respect to a slave device—with for example greater privileges, more processing power, more electrical power, more protection, more security or more functionality.

An aspect of the specification provides a carrying case comprising: a body enabled to mate with a mobile device to physically protect the mobile device; at least one input device, the body comprising the input device; a processor enabled to control communications with the mobile device; a power interface enabled to receive power from the mobile device to power the processor; and, a data interface enabled for relaying the communications between one or more of the at least one input device and the processor, and the mobile device, for controlling applications at the mobile device.

The carrying case can further comprise a unified interface comprising the power interface and the data interface. The unified interface can comprise one or more of a USB (Universal Serial Bus) interface and a micro-USB interface. The unified interface can comprise a micro-USB interface and input data is relayed from the at least one input device to the mobile device via one or more of a data+ pin, a data− pin and an ID (identifier) pin.

The processor can be further enabled to initially be powered by a data contact of the data interface during initiation of the communications between the processor and the mobile device, and then be powered via the power interface once the communications are established between the processor and the mobile device.

The processor can be further enabled to cause the mobile device to operate in a master mode, while the processor is enabled to operate in a slave mode.

The carrying case can further comprise a second power interface enabled to receive power from an external power source for powering the processor. The second power interface can be further enabled to relay the power to the mobile device when the second power interface is connected to the external power source. The power from the external power source can be relayed to the mobile device via the power interface.

The power interface can comprise an NFC (near field communication) interface.

The at least one input device can comprise one or more of a joystick, a touch slider, a touch dial, and a touch push button.

The body can comprise at least one receptacle for receiving and holding the mobile device. The power interface and the data interface can be located in the at least one receptacle such that, when the mobile device is received therein, the power interface mates with a corresponding power interface at the mobile device and the data interface mates with a corresponding data interface at the mobile device.

The body can comprise at least one flap enabled to encase the mobile device when the at least one flap is in a closed position. The at least one flap can comprise the at least one input device. The at least one input device can be exposed when the at least one flap is in an open position, and the at least one input device can be hidden when the at least one flap is in the closed position. The carrying case can further comprise two or more flaps, including the at least one flap, wherein one of the two or more flaps can be enabled as a stand to support the mobile device in a semi-upright position.

The carrying case can further comprise one or more of a soft case, a hard case and a combined hard and soft case.

The carrying case can further comprise one or more of a holster, a binder, a folio, a folio case, a folio hardshell, a shell, a hardshell, a softshell, a cover, a soft case, a hard case and a stand.

The carrying case can further comprise a notification device enabled to provide notifications of events at the mobile device when mated thereto.

FIG. 1 depicts a system 100 comprising a mobile device 101 and a carrying case 103 for controlling mobile device 101, according to non-limiting implementations. Mobile device 101 comprises a housing 109, which houses a processor 120 interconnected with a memory 122, a communications interface 124, a display 126, an input device 128, a speaker 132, a microphone 134, a data interface 135 and a power interface 136. In some optional implementations, mobile device 101 can further comprise a unified interface 137 comprising data interface 135 and power interface 136. Mobile device 101 further comprises a power source 140. Communications interface 124 will be interchangeably referred to as interface 124.

Figure 2:
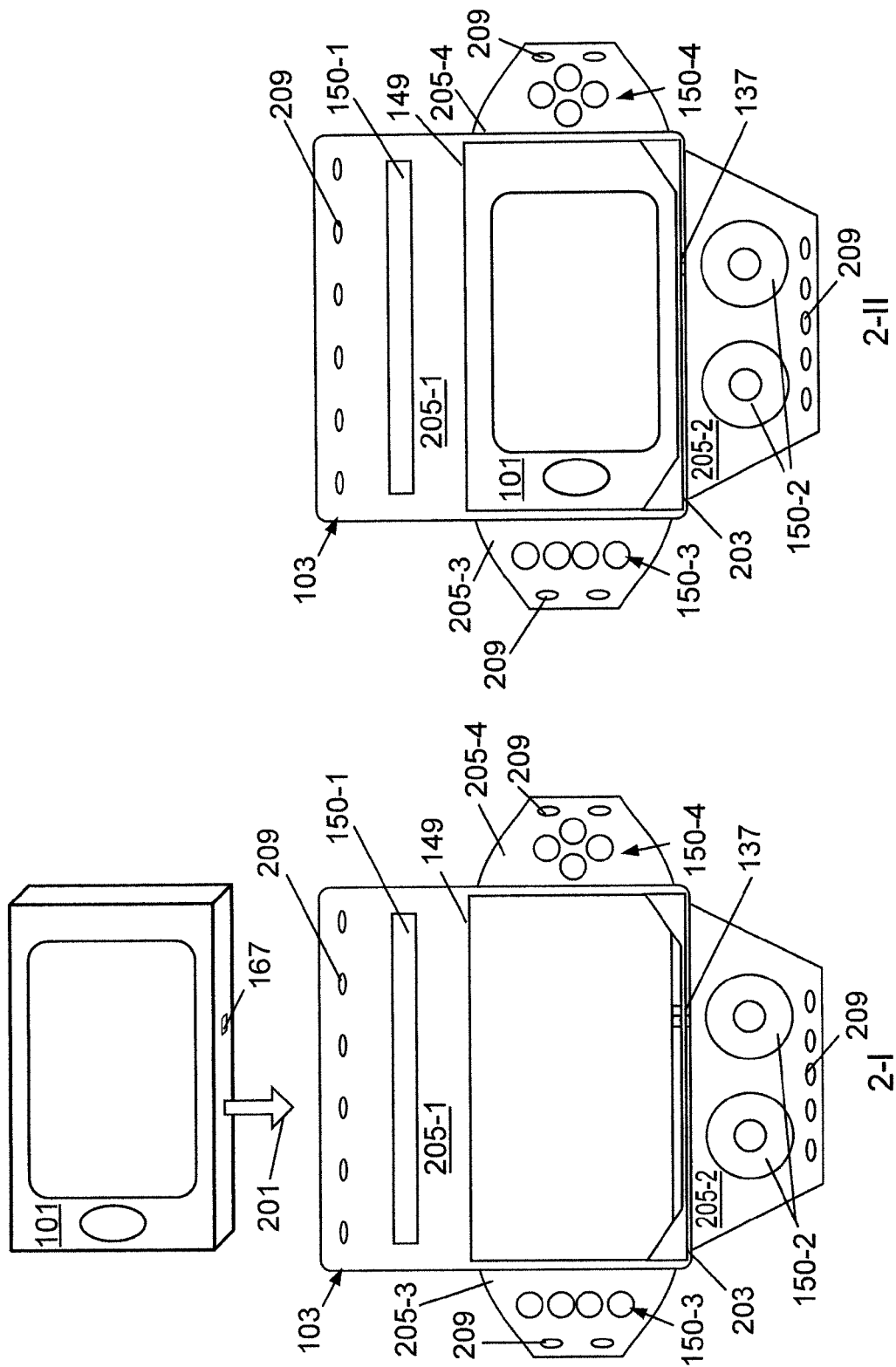
FIG. 2 depicts a sequence for mating the mobile device of FIG. 1 with the carrying case of FIG. 1 when the carrying case is in an open position, as well as relative locations of components thereof, according to non-limiting implementations.

Carrying case 103 comprises: a body 149 enabled to mate with mobile device 101 (including but not limited to housing 109) and physically protect mobile device 101. Carrying case 103 further comprise at least one input device 150, body 149 comprising at least one input device 150, as best seen in FIG. 2, as described below. Carrying case 103 further comprises a processor 160 enabled to control communication with mobile device 101. Carrying case 103 further comprises a data interface 165 enabled for relaying the communications between one or more of at least one input device 150 and processor 160 (in other words, communications of any kind between one or more of at least one input device 150 and processor 160 may be made, actively or passively or otherwise, by way of the data interface 165), and mobile device 101 such that input from at least one input device 150 can control applications at mobile device 101. Carrying case 103 further comprise a power interface 166 enabled to receive power from mobile device 101 to power processor 160. In some optional implementations, carrying case 103 can further comprise a unified interface 167 comprising data interface 165 and power interface 166.

It is appreciated that FIG. 1 further depicts schematic block diagrams of each of mobile device 101 and carrying case 103, which will hereafter be described in further detail.

It should be emphasized that the structures of mobile device 101 and carrying case 103 in FIG. 1 are purely examples. For example, as depicted in FIG. 1, it is contemplated that mobile device 101 comprises a device that can be used for implementing both wireless voice (e.g. telephony) and wireless data communications (e.g. email, web browsing, text, and the like), as well as any other specialized functions, including, but not limited, to one or more of, computing, and/or entertainment related functions. Similarly, as depicted in FIG. 1, it is contemplated that carrying case 103 can be used for receiving and controlling a device used for wireless voice and data communications, but carrying case 103 can be adapted for any sort of mobile device by adapting a form factor and/or input devices and/or interfaces of carrying case 103.

Mobile device 101 can be any type of electronic device that can be used in a self-contained manner to process applications, including but not limited to, gaming applications. Mobile device 101 includes, but is not limited to, any suitable combination of mobile electronic devices, mobile communications devices, mobile computing devices, portable electronic devices, portable computing devices, portable navigation devices, tablet computing devices, telephones, PDAs (personal digital assistants), cellphones, smartphones, e-readers, internet-enabled appliances and the like. It is further appreciated that some mobile devices may be handheld, that is, sized and shaped to be held and carried in as human hand, and used while held or carried. Other suitable devices are within the scope of present implementations.

Mobile device 101 comprises at least one input device 128 generally enabled to receive input data, and can comprise any suitable combination of input devices, including but not limited to a keyboard, a keypad, a pointing device, a mouse, a track wheel, a trackball, a touchpad, a touch screen and the like. Other input devices are within the scope of present implementations. Input data may include any commands, directions, orientations, reports, or other information entered by a user or otherwise caused or generated through use of the input device.

Input from input device 128 is received at processor 120 (which can be implemented as a plurality of processors, including but not limited to one or more central processors (CPUs). Processor 120 is configured to communicate with a memory 122 comprising a non-volatile storage unit (e.g. Erasable Electronic Programmable Read Only Memory ("EEPROM"), Flash Memory, and the like) and a volatile storage unit (e.g. random access memory ("RAM"), and the like). Programming instructions that implement the functional teachings of mobile device 101 as described herein are typically maintained, persistently, in memory 122 and used by processor 120 which makes appropriate utilization of volatile storage during the execution of such programming instructions. In some implementations, processor 120 comprises at least a portion of memory 122, for example as on-board random access memory (RAM). It is further appreciated that memory 122 is an example of computer readable media that can store programming instructions executable on processor 120. Furthermore, memory 122 is also an example of a memory unit and/or memory module.

Processor 120 can be further configured to communicate with display 126, microphone 134 and speaker 132. Display 126 comprises any suitable one of, or combination of, CRT (cathode ray tube) and/or flat panel displays (e.g. LCD (liquid crystal display), high definition displays, plasma, OLED (organic light emitting diode), capacitive or resistive touch screens, and the like). Further, in some implementations, mobile device 101 can be further enabled to communicate with an external display device, for example via an optional interface and/or connector (not depicted), including, but not limited to, a High-Definition Multimedia Interface (HDMI) and/or connector. Microphone 134 comprises a microphone for receiving sound and converting to sound data at mobile device 101. Speaker 132 comprises a speaker for providing sound from sound data, audible alerts, audible communications from remote communication devices, and the like, at mobile device 101.

Processor 120 also connects to interface 124, which is implemented as one or more radios and/or connectors and/or network adaptors, configured to wirelessly communicate with one or more communication networks (not depicted). It will be appreciated that, in these implementations, interface 124 can be configured to correspond with network architecture that is used to implement one or more communication links to the one or more communication networks, including but not limited to any suitable combination of USB (universal serial bus) cables, serial cables, wireless links, cell-phone links, cellular network links (including but not limited to 2G, 2.5G, 3G, 4G+, UMTS (Universal Mobile Telecommunications System), CDMA (Code division multiple access), WCDMA (Wideband CDMA), FDD (frequency division duplexing), TDD (time division duplexing), TDD-LTE (TDD-Long Term Evolution), TD-SCDMA (Time Division Synchronous Code Division Multiple Access) and the like, wireless data, Bluetooth links, NFC (near field communication) links, WiFi links, WiMax links, packet based links, the Internet, analog networks, the PSTN (public switched telephone network), access points, and the like, and/or a combination. When interface 124 is configured to communicate with one or more communication networks, interface 124 can comprise further protocol specific antennas there for (not depicted).

Housing 109 can comprise any housing, casing, and the like, enabled to be at least one of held and carried by a human hand. In general, housing 109 houses the components of mobile device 101; however some components can be visible via apertures, windows and the like in housing 109. For example, in some implementations, indicators and/or a portion of display 126 can be exposed.

Mobile device further comprises power source 140, including but not limited to a battery and/or a power pack, or any other suitable (typically electric) power source and that mobile device 101 can power carrying case 103 via power interface 136.

Processor 120 is further interconnected with a data interface 135 and a power interface 136 that are respectively complementary to data interface 165 and power interface 166 of carrying case 103. In other words, when mobile device 101 is mated with carrying case 103, carrying case 103 can communicate with mobile device 101 via mated data interfaces 135, 165 and receive power from power source 140 of mobile device 101 via mated power interfaces 136, 166, as described in further detail below. In specific implementations, one or more of combinations of data interfaces 135, 165 and power interfaces 136, 166 can comprise physically mating connectors including, but not limited to USB (Universal Serial Bus connectors), barrel connectors and the like In some implementations, data interface 135 and power interface 136 can be combined in a unified interface 137 comprising data interface 135 and power interface 136, as described below.

In any event, it should be understood that a wide variety of configurations for mobile device 101 are contemplated.

Turning now to carrying case 103, as depicted in FIG. 1, it is contemplated that carrying case 103 comprises a carrying device enabled to receive input data at least one input device 150 for controlling applications at mobile device 101, for example via data interfaces 135, 165. Hence, body 149 of carrying case 103 is generally enabled to mate with mobile device 101 and/or housing 109. Body 149 can hence comprise any housing, casing, and the like, enabled to be at least one of held and carried by a human hand.

Indeed, it is appreciated that both mobile device 101 and carrying case 103 are generally enabled for portability, and hence together (e.g. when mated) are generally enabled to be "light-weight" (for example, under about 200 grams) and enabled to be carried by a human hand and/or enabled to be easily transported, for example by attaching the combination of mobile device 101 and carrying case 103 to a strap, clothing, and the like, and/or by placing the combination of mobile device 101 and carrying case 103 into a carrying bag, such as purse, backpack and the like. Indeed, while carrying case 103 and/or body 149 can be enabled to mate with a tablet device (e.g. mobile device 101 could comprise a tablet device), present implementations are particularly useful when mobile device 101 comprises a smartphone, cellphone, PDA and the like, and carrying case 103/body 149 is enabled to mate mobile device 101, as described herein.

In general, body 149 houses the components of carrying case 103; however as best seen in FIG. 2, some components can be visible via apertures, windows and the like in housing 109. For example, at least one input device 150 is generally exposed, at least when carrying case 103 is in an open position.

In some implementations, as described below with reference to FIG. 2, body 149 comprises a holster for receiving mobile device 101. The holster can comprise any suitable apparatus for carrying mobile device 101, including, but not limited to, a sleeve, a sheath, a carrying case, a wallet, a folder, a portfolio, bag and/or other receptacle.

However, body 149 is not limited to holsters and can comprise any combination of a holster, a binder, a folio, a folio case, a folio hardshell, a hardshell (or hard case), a softshell (or soft case), a cover, a stand, and the like. Furthermore, body 149 can comprise one or more of soft case, a hard case and/or a combination thereof. In other words, a portion of body 149 can comprise soft materials, including but not limited to leather, soft plastics, and the like, and another portion of body can comprise hard materials, including but not limited to metal, hard plastics, and the like.

Processor 160 is further interconnected with data interface 165 and power interface 166 that are respectively complementary to data interface 135 and power interface 136 of mobile device 101. In other words, when mobile device 101 is mated with carrying case 103, carrying case 103 can communicate with mobile device 101 via mated data interfaces 135, 165 and receive power from power source 140 of mobile device 101 via mated power interfaces 136, 166.

Processor 160 can comprise one or more of a processor, central processing unit (CPU), a micro-processor, and the like. Furthermore, processor 160 can be enabled to implement any suitable wired and/or wireless communication protocol in conjunction with one or more of data interface 165 and power interface 166, to communicate with mobile device 101 as described in further detail below. However, whether communications with mobile device 101 is wired and/or wireless, it is appreciated that processor 160 is generally enabled to control communications with mobile device 101.

In some implementations, data interface 165 and power interface 166 can be combined in unified interface 167 comprising data interface 165 and power interface 166. For example, unified interface 167 can comprise one or more of a USB (Universal Serial Bus) interface and a micro-USB interface. Hence, in these implementations, processor 160 can be enabled to implement one or more of USB protocols and micro-USB protocols in conjunction with unified interface 167. In these implementations, data interface 135 and power interface 136 at mobile device 101 comprise complementary unified interface 37. In particular non-limiting implementations, for example where mobile device 101 comprises a mobile communications device, unified interfaces 167, 137 at each of carrying case 103 and mobile device 101 can comprise complementary micro-USB interfaces, including, but not limited to micro-USB type B interfaces. In these implementations, one of unified interfaces 137, 167 comprises a male micro-USB interface, for example unified interface 167 at carrying case 103, and the other of unified interfaces 137, 167 comprises a complementary female micro-USB interface, for example unified interface 137 at mobile device 101.

In any event when unified interfaces 137, 167 are mated to one another, power is supplied from mobile device 101 to carrying case 103 via mated unified interfaces 137, 167, and data is exchanged between mobile device 101 and carrying case 103 via mated unified interfaces 137, 167.

In other implementations data interface 165 and power interface 166 can be discrete from one another. For example, in some implementations, power interface 166, and complementary power interface 136 at mobile device 101, can comprise induction devices which are generally enabled to interact with each other when in proximity, and hence can be similar types of induction devices. In particular non-limiting implementations, each of power interfaces 136, 166 can comprise near field communication (NFC) antennas, including, but not limited to, NFC antennas, such as NFC loop antennas. Hence, power conveyed there between are appreciated to be conveyed via NFC signals; furthermore, protocols for powering carrying case 103 from mobile device 101 can be based on NFC protocols. However, other types of induction devices are within the scope of present implementations. For example, power interfaces 136, 166 can be based on RFID (radio frequency identification) antennas and technology, and power conveyed there between can be conveyed via RFID signals; furthermore protocols for powering carrying case 103 from mobile device 101 can be based on RFID protocols. In any event, in implementations where carrying case 103 is powered from mobile device 101 via induction, it is further appreciated that when body 149 is mated with mobile device 101, power interfaces 136, 166 are generally aligned such that power interface 166 can efficiently receive power from power interface 136.

However, a discrete power interface 166 is not limited to power wireless interfaces and a discrete power interface 166, power interface 136 combination can comprise physical connectors, including, but not limited to, barrel connectors.

Hence, it is further apparent that unified interfaces 137, 167 (and/or one or more of data interfaces 135, 165 and power interfaces 136, 166) can communicate power and/or data via a wired connection and/or a wireless connection.

For example, in some implementation, unified interfaces 137, 167 (and/or one or more of data interfaces 135, 165 and power interfaces 136, 166) can be enabled to communicate via WiFi protocols, Bluetooth™ protocols, NFC protocols and the like. Hence, in these implementations, processor 160 can be enabled to implement one or more of WiFi protocols, Bluetooth™ protocols, NFC protocols and the like in conjunction with unified interface 167 (and/or one or more of data interface 165 and power interfaces 166). It is further appreciated that communication functionality of mobile device 101 is similar to communication functionality of carrying case 103. In other words, carrying case 103 can comprise one or more of a WiFi device, a Bluetooth™ device, an NFC device, and the like, and mobile device 101 can correspondingly comprise one or more of a WiFi device, a Bluetooth™ device, an NFC device for communicating with carrying case 103.

At least one input device 150 can comprise, but is not limited to, one or more of a joystick, a touch slider, a touch dial, and a touch push button. Some input devices 150, such as a touchscreen, can be enabled to supply output to a user as well as receive input from a user. It is further appreciated that, in some implementations, at least one input device 150 can require power to be operational; in these implementations; power is supplied via power interface 166 receiving power from power interface 136 of mobile device 101 when mated thereto.

Attention is next directed to FIG. 2, which depicts a perspective view of a sequence in which mobile device 101 is received in carrying case 103, according to non-limiting implementations. It is further appreciated that FIG. 2 further depicts front perspective views of carrying case 103 in an open position, both alone and mated with mobile device 101.

In a view 2-I, mobile device 101 is depicted just prior to being received at carrying case 103 as indicated by arrow 201, while in view 2-II, mobile device 101 has been received in carrying case 103. It is further assumed in FIG. 2 that carrying case 103 comprises unified interface 167 and mobile device 101 comprises complementary unified interface 137.

From views 2-I, 2-II it is further apparent that body 149 comprises a receptacle 203 for receiving and holding mobile device 101; in specific non-limiting depicted example implementations, receptacle 203 comprises a one or more pockets and/or slots for receiving and holding at least two corners of mobile device 101. For example, in depicted implementations, each pocket of receptacle 203 is defined by raised triangular shaped sheets of material (such as a plastic, a metal and the like) enabled to receive respective opposing corners of mobile device 101 along a longitudinal axis of mobile device 101. However, in other implementations, receptacle 203 can comprise any suitable combination of slots, snaps, pockets and the like for receiving mobile device 101 longitudinally or laterally (i.e. mobile device 101 can be received sideways and/or upright).

It is yet further appreciated that, in depicted example limitations, unified interface 167 (i.e. data interface 165 and power interface 166) is located in the at least one receptacle 203 such that, when mobile device 101 is received therein, power interface 166 mates with corresponding power interface 136 at mobile device 101 and data interface 165 mates with corresponding data interface 135 at mobile device 101. In other words, unified interfaces 137, 167 are located such that they are aligned when mobile device 101 is received in receptacle 203. Hence, when mobile device 101 is received in receptacle 203, unified interfaces 137, 167 can mate. In depicted implementations, unified interface 137 is located on a side of mobile device 101.

From FIG. 2, it is further apparent that body 149 further comprises at least one flap 205-1, 205-2, 205-3, 205-4 enabled to encase mobile device 101 when the at least one flap 205-1, 205-2, 205-3, 205-4 is in a closed position (as best appreciated from FIG. 3, described below). Flaps 205-1, 205-2, 205-3, 205-4 will be interchangeably referred to hereafter collectively as flaps 205 and generically as a flap 205. In any event, flaps 205 are located above and below receptacle 203 (e.g. as depicted, flap 205-1 is above receptacle 203 and flap 205-2 is below receptacle 203) and on either side of receptacle 203 (i.e. as depicted, flap 205-3 is to the left of receptacle 203 and flap 205-4 is to the right of receptacle 203). As depicted in FIG. 2, each flap 205 is in an open position, and it is further apparent that one or more of flaps 205 comprises one or more respective input devices 150-1, 150-2, 150-3, 150-4 (interchangeably referred to hereafter collectively as input devices 150 and generically as input device 150, as in FIG. 1). For example, input device 150-1 comprises a touch slider, input devices 150-2 comprise two touch dials, input devices 150-3 comprise four vertically aligned touch buttons and input devices 150-4 comprise four touch buttons arranged in a diamond pattern. However, in other implementations, not all flaps 205 comprise a respective input device 150; for example, in some implementations, only one flap 205 comprises an input device 150.

Further, a number of input devices 150 at each flap 205 are generally non-limiting. As depicted, each flap 205 comprises one or more input devices 150, while in other implementations the number of input devices 150 at each flap 205 can be as few as zero (presuming at least one other flap 205 comprises at least one input device 205); in general there is no upper limit on the upper limit of input devices 150 at each flap, other than considerations of respective sizes of each flap 205 and respective input devices 150, as well as available input ports at processor 160.

Figure 3:
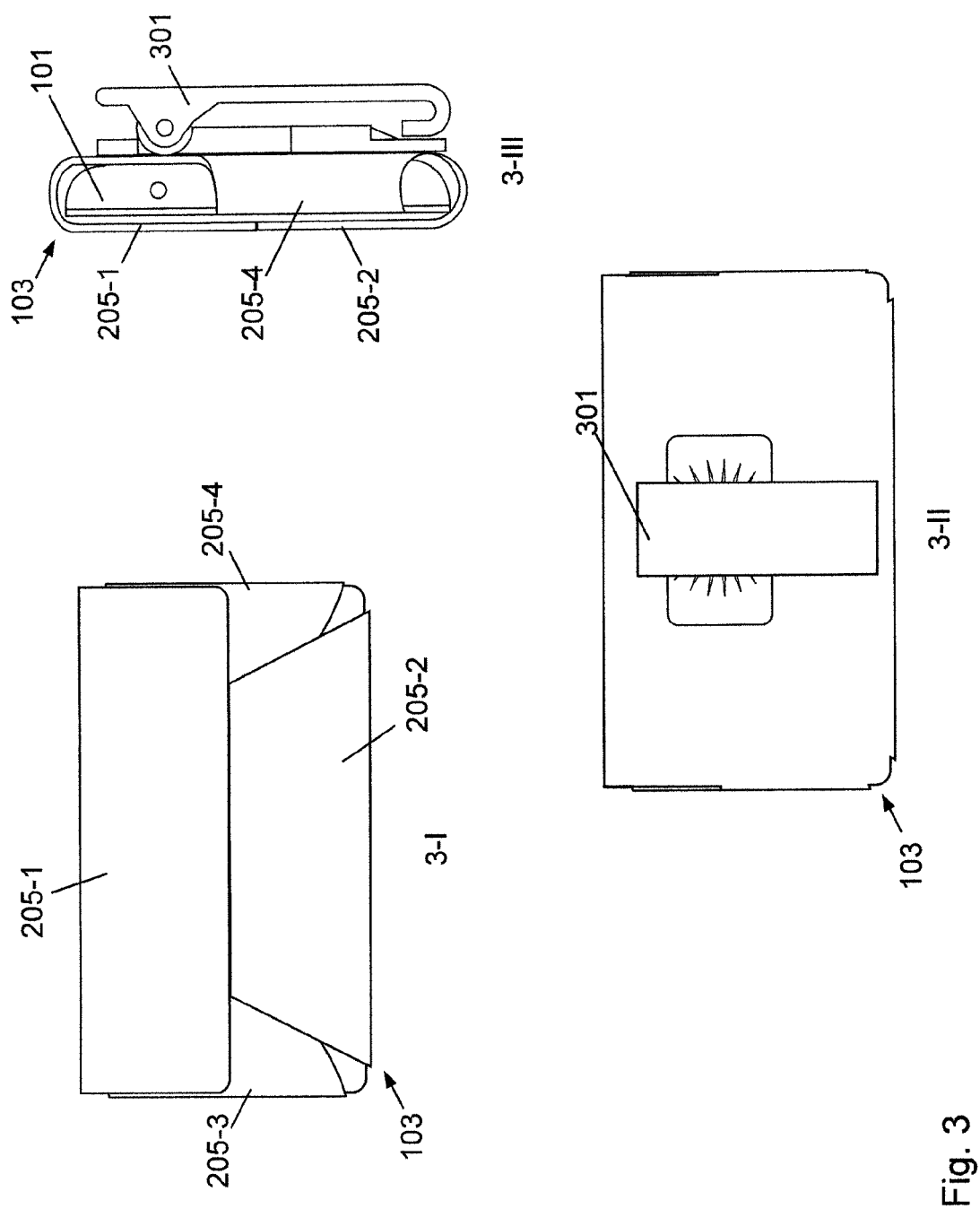
FIG. 3 depicts front, side and rear perspective views of the carrying case of FIG. 1, in a closed position, with the mobile device encased therein, according to non-limiting implementations.

It is also apparent that at least one input device 150 is exposed when at least one respective flap 205 is in an open position, and, as best seen in FIG. 3, described below, at least one input device 150 is hidden when at least one respective flap 205 is in a closed position.

Further, while four flaps 205 are depicted in FIG. 2, it is appreciated that the number of flaps 205 is not unduly limiting. For example, in some implementations, carrying case 103 comprises no flaps; rather, in these implementations, carrying case 103 can comprise a protective shell, with input device(s) 150 located on an exterior of the shell, for example, see FIG. 11, described below.

It is further appreciated that, while processor 160 is not depicted in FIG. 2, body 149 comprises processor 160, and input devices 150 are in communication with unified interface 167 via processor 160.

Alternatively, and as depicted in FIG. 2, carrying case 103 and/or one or more of flaps 205 can further comprise at least one magnet 209, which can be detected by mobile device 101 via a magnetometer or the like (i.e. mobile device 101 can comprise an optional magnetometer or the like, positioned to detect magnet(s) 209), thereby causing mobile device 101 to enter a holster mode when flaps 205 are in a closed position: for example, display 126 can be disabled in the holster mode. Further magnets 209 can interact with one another to assist in holding flaps 205 when flaps 205 are in a closed position.

Attention is next directed to FIG. 3 which depicts a front view 3-I, a rear view 3-II, and a right side view 3-III of mobile device 101 mated with carrying case 103 when flaps 205 are in a closed position. From FIG. 3, it is apparent that at least one flap 205 is enabled to encase mobile device 101 when at least one flap 205 is in a closed position. Furthermore, body 149 and/or flaps 205 physically protect mobile device 101 when mobile device 101 is encased therein, for example, by providing an additional layer of material that can absorb an impact and/or protect mobile device 101 from scratching, impacts, contaminants, sunlight and the like. To physically protect mobile device 101, body 149 can include one or more structures that, for example, resist impacts, and/or repel water, and/or block ultraviolet radiation, and/or deter theft or unauthorized usage, and/or add structural integrity, and/or any combination thereof.

Furthermore, in these implementations, mobile device 101 comprises a clip 301 at a rear of carrying case 103, clip 301 enabled to be clipped to an object (including, but not limited to, clothing, a strap, a belt, and the like) for transporting carrying case 103 and mobile device 101 when mated thereto.

Figure 4:
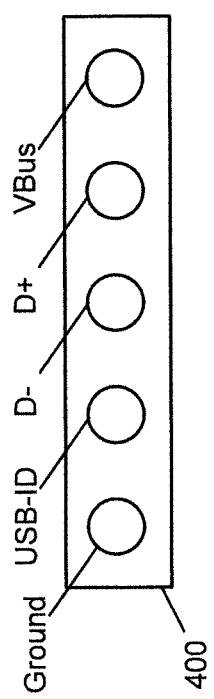
FIG. 4 depicts a pin diagram of a unified interface at the carrying case of FIG. 1 for mating with a complementary unified interface at the mobile device of FIG. 1, according to non-limiting implementations.

Attention is next directed to FIG. 4 which depicts a specific non-limiting example implementation of a pin diagram of unified interface 400 at carrying case 103 (i.e. unified interface 167 comprises unified interface 400), according to non-limiting implementations. In general, unified interface 400 can be mated to a complementary unified interface at mobile device 101. In these implementations, unified interface 400 comprises a micro-USB interface, comprising five pins: a ground pin; a first data pin D+ (data+ or data-plus); a second data pin D− (data− or data-minus); a third data pin USB-ID (USB-Identification, also known as an ID (identifier) pin) which can be generally enabled for conveying identification information between carrying case 103 and mobile device 101; and a voltage supply pin VBus. When carrying case 103 and mobile device 101 are first mated, pin USB-ID supplies about 1.8V from mobile device 101. As mobile device 101, in these implementations, is enabled for USB protocols, and is generally further enabled to initially operate in a slave mode, no voltage is initially supplied on pin VBus; rather, in slave mode, mobile device 101 will generally be expecting to receive power on pin VBus.

It is yet further appreciated that pins VBus, Ground correspond to power interface 166 and pins D+, D−, USB-ID corresponds to data interface 165.

Figure 5:
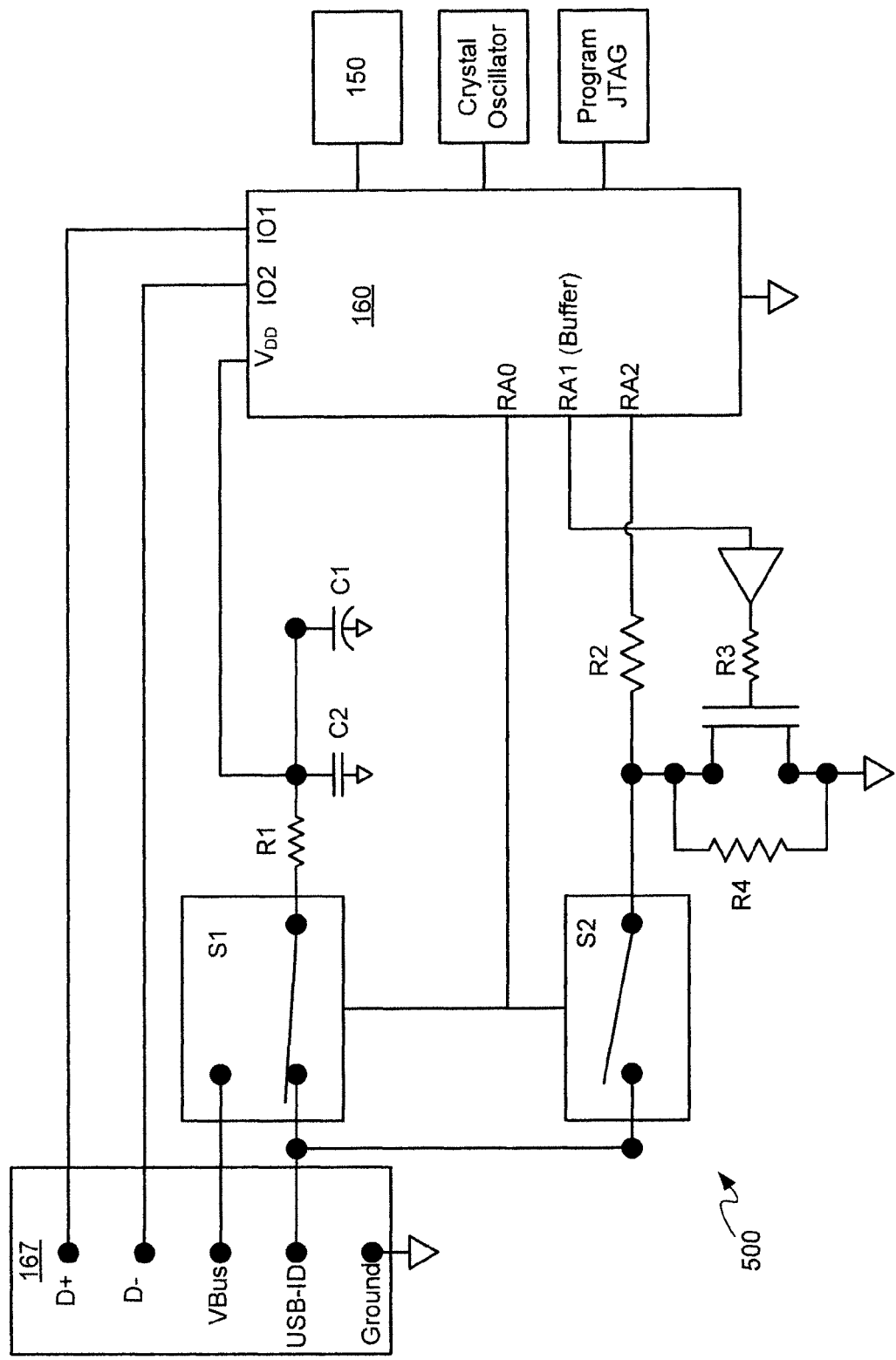
FIG. 5 depicts a schematic circuit diagram at the carrying case of FIG. 1 when the carrying case is initially mated with the mobile device of FIG. 1, according to non-limiting implementations.
Figure 6:
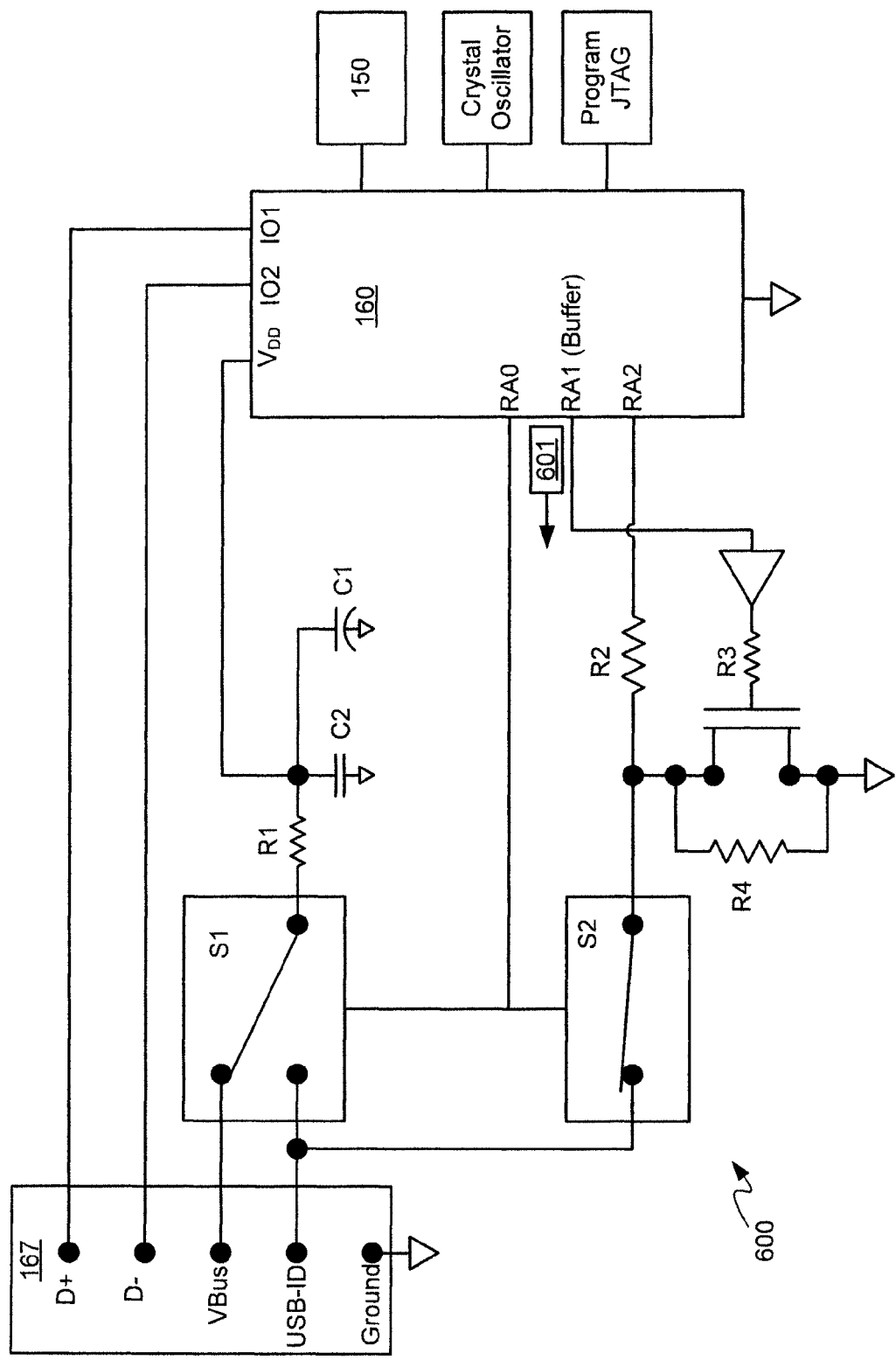
FIG. 6 depicts the schematic circuit diagram of FIG. 5 once power has been provided to a processor at the carrying case, according to non-limiting implementations.

In any event, attention is next directed to FIGS. 5 and 6, each of which depict a circuit 500 at carrying case 103 in specific non-limiting implementations where unified interface 167 comprises a micro-USB interface similar to unified interface 400 of FIG. 4 (and hence unified interface 137 comprises a similar complementary unified interface). Hence, pins D+, D−, VBus, USB-ID, Ground of unified interface 137 in FIGS. 5 and 6 correspond to D+, D−, VBus, USB-ID, Ground of FIG. 4, though in a different order for clarity (i.e. the order of pins D+, D−, VBus, USB-ID, Ground of FIGS. 5 and 6 are not be construed as a physical order of micro-USB pins). Further, FIG. 5 depicts circuit 500 in an initial state (i.e. when carrying case 103 is initially mated with mobile device 101) and FIG. 6 depicts circuit 600 in an operating state (i.e. once carrying case 103 has established communications with mobile device 101, for receiving input data from input device(s) 150).

Further while not depicted, circuit 500 can comprise an ESD (electrostatic discharge) protection circuit for each of pins D+, D−, VBus, USB-ID and/or a common ESD protection circuit for pins D+, D−, VBus, USB-ID.

In any event, pins D+, D1 are connected to corresponding input/output pins, IO1, IO2 at processor 160. Processor 160 is also connected to at least one input device 150, as well as a "Crystal Oscillator" for timing, and an input "Program JTAG" ("Joint Test Action Group") for receiving flash images of programming instructions, and the like. Pin Ground is connected to ground.

However, pin VBus and pin USB-ID are each connected to a switch S1 controlled by an input/output pin RA0 of processor 160, which is in turn connected a voltage input $V_{DD}$ at processor 160 for powering processor 160, as well as a capacitor C1 that can be charged to power processor 160 (at least temporarily). Hence, processor 160 can switch S1 between pin VBus and pin USB-ID via in input/output pin RA0 at processor 160, such that processor 160 can be powered from either pin USB-ID, as in FIG. 5, or pin VBus, as in FIG. 6. It is appreciated that, when carrying case 103 is initially mated with mobile device 101, switch S1 is connected to pin USB-ID, as depicted in FIG. 5 (i.e. switch S1 is enabled to default to a connection between pin USB-ID and input $V_{DD}$).

In any event, as described above, pin USB-ID is initially supplied with 1.8 V from power source 140 of mobile device; hence when carrying case 103 is initially mated with mobile device 101, and as switch S1 initially connects pin USB-ID to input $V_{DD}$, processor 160 is initially powered from pin USB-ID as capacitor C1 charges.

Further, capacitor C1 is connected to a resistor R1 which can provide ESD protection for capacitor C1 (and capacitor C2), and provide a damping time constant for charging capacitor C1. In specific non-limiting implementations capacitor C1 comprise about 10 μF, capacitor C2 can comprise about 0.1 μF and resistor R1 can comprise about 100Ω. In these implementations, resistor R2 can comprise about 100Ω, resistor R3 can comprise about 47.5 Ω and resistor R4 can comprise about 499Ω. However, values for capacitors C1, C2, resistors R1, R2, R3 are not to be unduly limiting and it is appreciated that other values and/or combinations of values for capacitors C1, C2, resistors R1, R2, R3 are within the scope of present implementations, and can depend on inputs/outputs at processor 160 and any other circuit design considerations.

Furthermore, voltage is not initially supplied on pin VBus as mobile device 101 is initially in a slave mode, as described above.

It is yet further appreciated that processor 160 further controls a switch S2 via input/output pin RA0, switch S2 controlling a connection between pin USB-ID and input/output pins RA1, RA2 of processor 160, as described below. Initially switch S2 is open, as in FIG. 5, so that there is no connection between pin USB-ID and input/output pins RA1, RA2.

It is yet further appreciated that the positions of switches S1, S2 in FIG. 5 are default positions that occur when no power is provided to processor 160.

It is yet further appreciated that processor 160 can shut down power to input device(s) 150 when carrying case 103 is first mated to mobile device 101 and processor 160 powers up. In other words, if processor 160 was in a mode where power was supplied to input device(s) 150 when power to processor 160 was last shut off, processor 160 shuts down power to input device(s) 150.

Once power is supplied to processor 160, processor 160 is enabled to determine that processor 160 is powering up from an idle mode reset, and is further enabled to control (via RA0) switch S1 to connect to pin VBus, and to close switch S2 to connect pin USB-ID to input/outputs RA1, RA2, as depicted in FIG. 6. In other words, in these implementations, processor 160 is generally enabled to control communications with mobile device 101 not only via controlling the flow of data between carrying case 103 and mobile device 101 (e.g. according to whichever protocol carrying case 103 and mobile device 101 are communicating with), but also by controlling the physical position of switches S1, S2. In some implementations, processor 160 can comprise a timer that switches S1, S2 from the positions in FIG. 5 to the positions in FIG. 6 after a given time period, once processor 160 receives power from pin USB-ID.

Processor 160 then transmits an identifier 601 associated with carrying case 103 (stored at a memory accessible to processor 160 and/or coded into programming instructions at processor 160) to mobile device 101 over pin USB-ID. Mobile device 101 is enabled, in these implementations, to receive identifier 601 and determined there from that mobile device 101 should operate in a master mode (e.g. a master USB mode, which can also be referred to as an embedded host mode). For example, in these implementations, mobile device 101 can store a table, or the like, at memory 122 that stores identifier 601 in association with an instruction, or the like, to cause mobile device 101 to operate in a master USB mode when identifier 601 is received via pin USB-ID. It is further appreciated that processor 160 is enabled to operate in a slave mode (e.g. a slave USB mode) as a default mode.

In any event, once mobile device 101 is operating in a master mode, rather than a slave mode, mobile device 101 thereafter supplies voltage to pin VBus, thereafter powering processor 160 as switch S1 is now connecting pin VBus to input $V_{DD}$ at processor 160. Processor 160 can thereafter power input device(s) 150.

Furthermore, input data received at input device(s) 150 can be relayed to mobile device 101 via pins D+, D− using input/outputs IO1, IO2 of processor 160. Alternatively, input data received at input device(s) 150 can be relayed to mobile device 101 via pin USB-ID. Either way, further identification, communication and control data is passed between processor 160 and mobile device 101 via pin USB-ID and input/outputs RA1, RA2 of processor 160.

When carrying case 103 is removed/unmated from mobile device 101, and processor 160 loses power, switches S1, S2 return to the default state of FIG. 5 in preparation for mobile device 101 being again mated with carrying case 103 at some point in the future.

Hence, in these implementations, processor 160 is enabled to initially be powered by a data contact (e.g. pin USB-ID) of one or more of data interface 165 and unified interface 167 during initiation of communications between processor 160 and mobile device 101, and then be powered via power interface 166 (i.e. pin VBus) once communications are established between processor 160 and mobile device 101. Furthermore, in these implementations, processor 160 is enabled to cause mobile device 101 to operate in a master mode, while processor 160 is enabled to operate in a slave mode.

Further, it is appreciated that circuit 500 is provided as an example of non-limiting implementations of carrying case 103 and other circuits are within the scope of present implementations.

In any event, it is appreciated that processor 160 is at least enabled to control communications with mobile device 101, for example by controlling switches S1, S2 and/or by relaying input data received at input device(s) to mobile device 101. For example, as depicted in FIGS. 5 and 6, input device(s) 150 are in communication with processor 160, which receives input data received at input device(s) 150 and relays the input data to mobile device 101 via appropriate input/output pins IO1, IO2 and/or via input/output pins RA1, RA2.

Hence, processor 160 is generally enabled to control communications with mobile device 101 by one or more of: controlling one or more of inputs and output through which one or more of power and data is received and/or transmitted; controlling switches to control the inputs and/or outputs; facilitating and/or mediating flow of data between input device(s) 150 and mobile device 101 (e.g. by acting as an intermediary between input device(s) 150 and mobile device 101, data being relayed via data interface 165).

Figure 7:
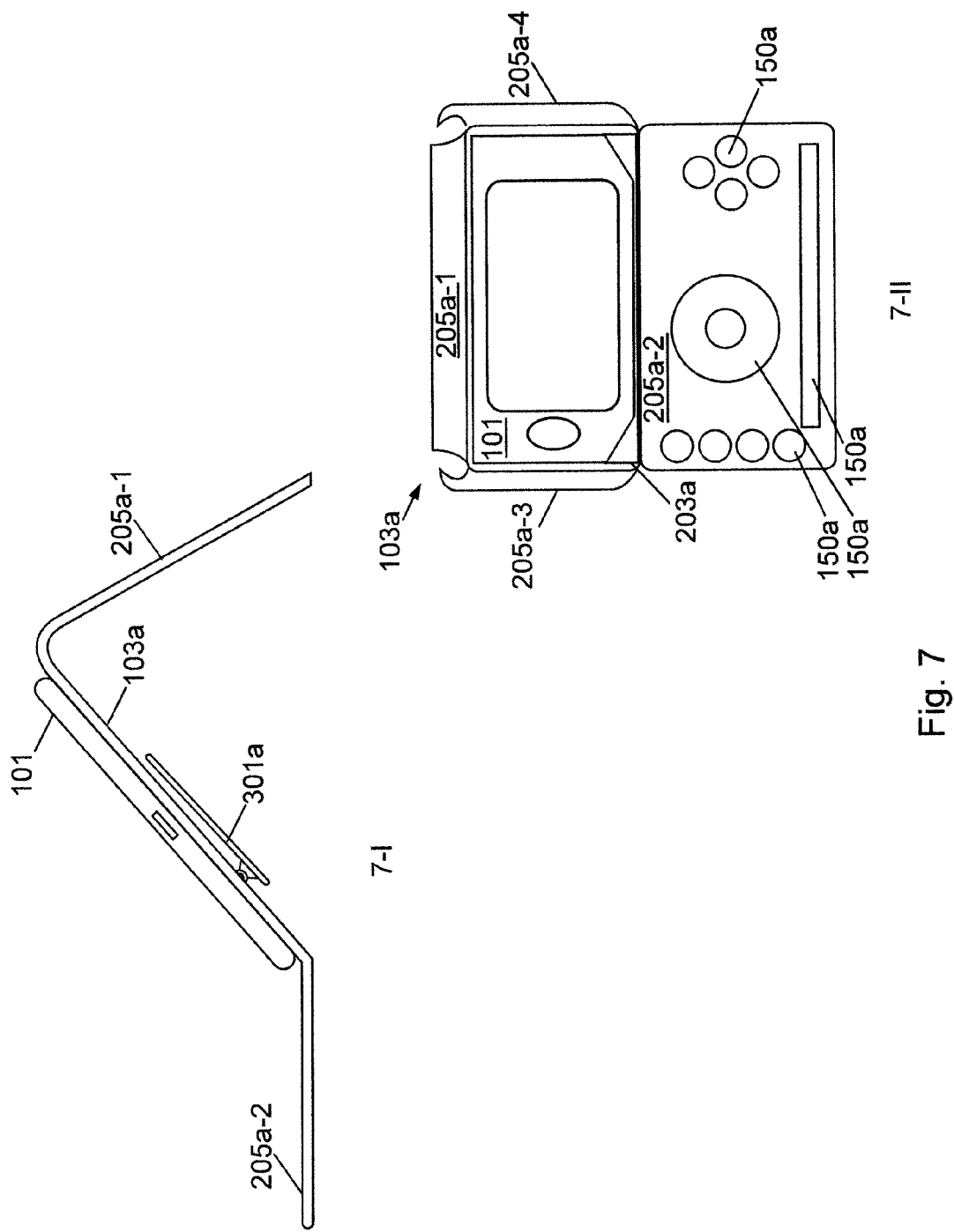
FIG. 7 depicts a side and front perspective views of an alternative implementation of a carrying case mated to a mobile device, where the carrying case is enabled as a stand, according to non-limiting implementations.

Attention is next directed to FIG. 7 which depicts a side perspective view 7-I and a front perspective view 7-II of an alternative carrying case 103a mated with mobile device 101. Carrying case 103a is substantially similar to carrying case 103 with like elements having like numbers, however with an "a" appended thereto. However, in these implementations, carrying case 103a comprises four flaps 205a-1, 205a-2, 205a-3, 205a-4 (referred to interchangeably hereafter collectively as flaps 205a and generically as a flap 205a), wherein flaps 205a-1, 205a-2 are enabled as a stand to support mobile device 101 in a semi-upright position. In other words, flap 205a-1, located above receptacle 203a, acts as a stand to support carrying case 103a when mobile device 101 is mated thereto, and flap 205a-2, located below receptacle 203a, further assists at supporting the weight of carrying case 103a and mobile device 101. In other words, flap 205a-1 folds behind carrying case 103a and so that an end of flap 205a-1 rests on a surface, while flap 205a-2 folds in front of carrying case 103a so that flap 205a-flays flat on the surface in front of carrying case 103a.

Further, in these implementations, input devices 150a are located at flap 205a-2 so that they are accessible when flap 205a-2 is laying flat the surface. Side flaps 205a-3, 205a-4 are appreciated to fold behind carrying case 103a, but do not fold on top of clip 301a.

While not depicted, it is further appreciated that carrying case 103a comprises a processor, a data interface, and a power interface respectively similar to processor 160, data interface 165 and power interface 166; further carrying case 103a can comprise magnets, similar to magnets 209.

Figure 8:
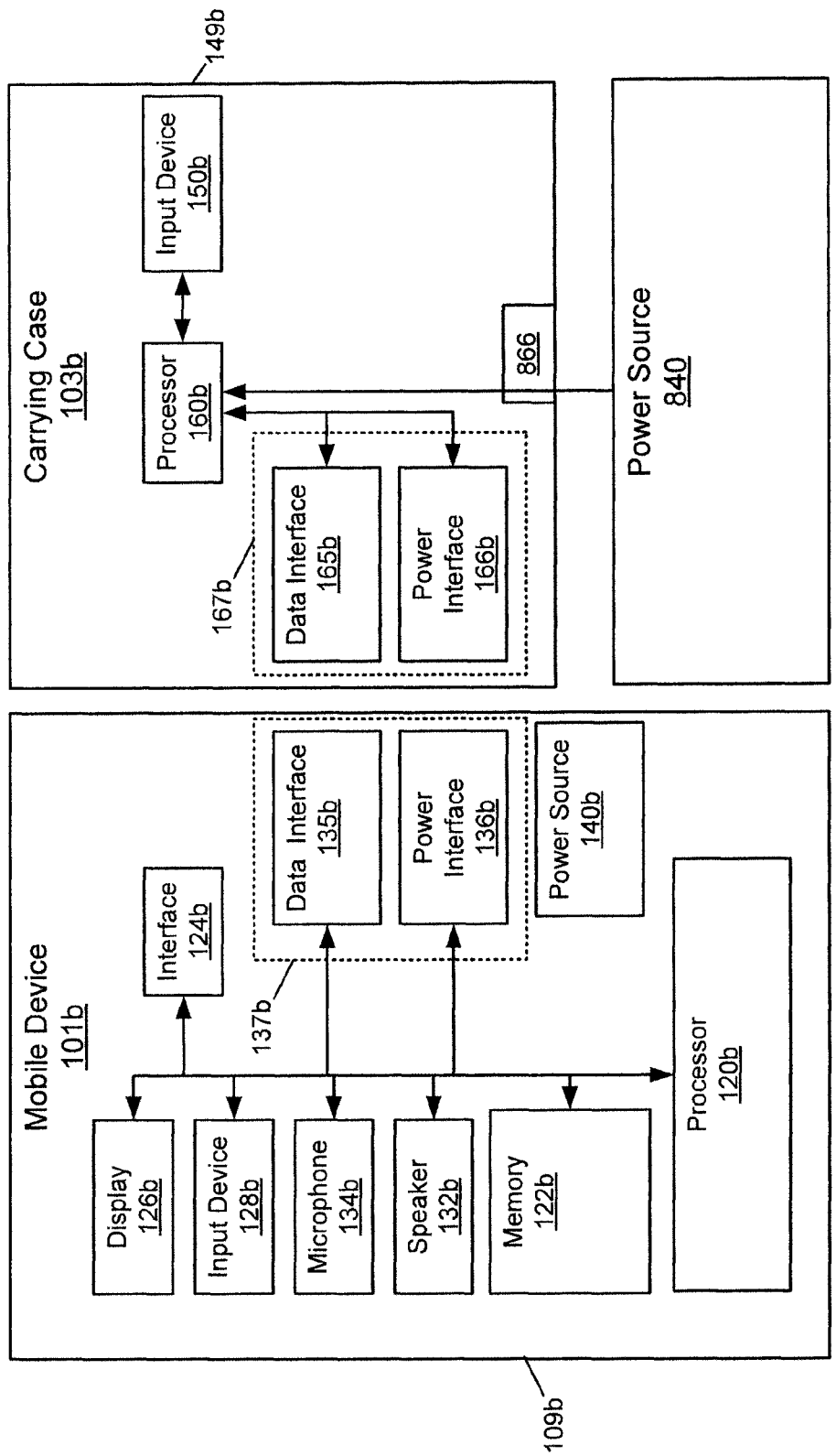
FIG. 8 depicts a schematic block diagram of a system including an alternative carrying case device for controlling a mobile device and an external power source used to power the alternative carrying case, according to non-limiting implementations.
Figure 9:
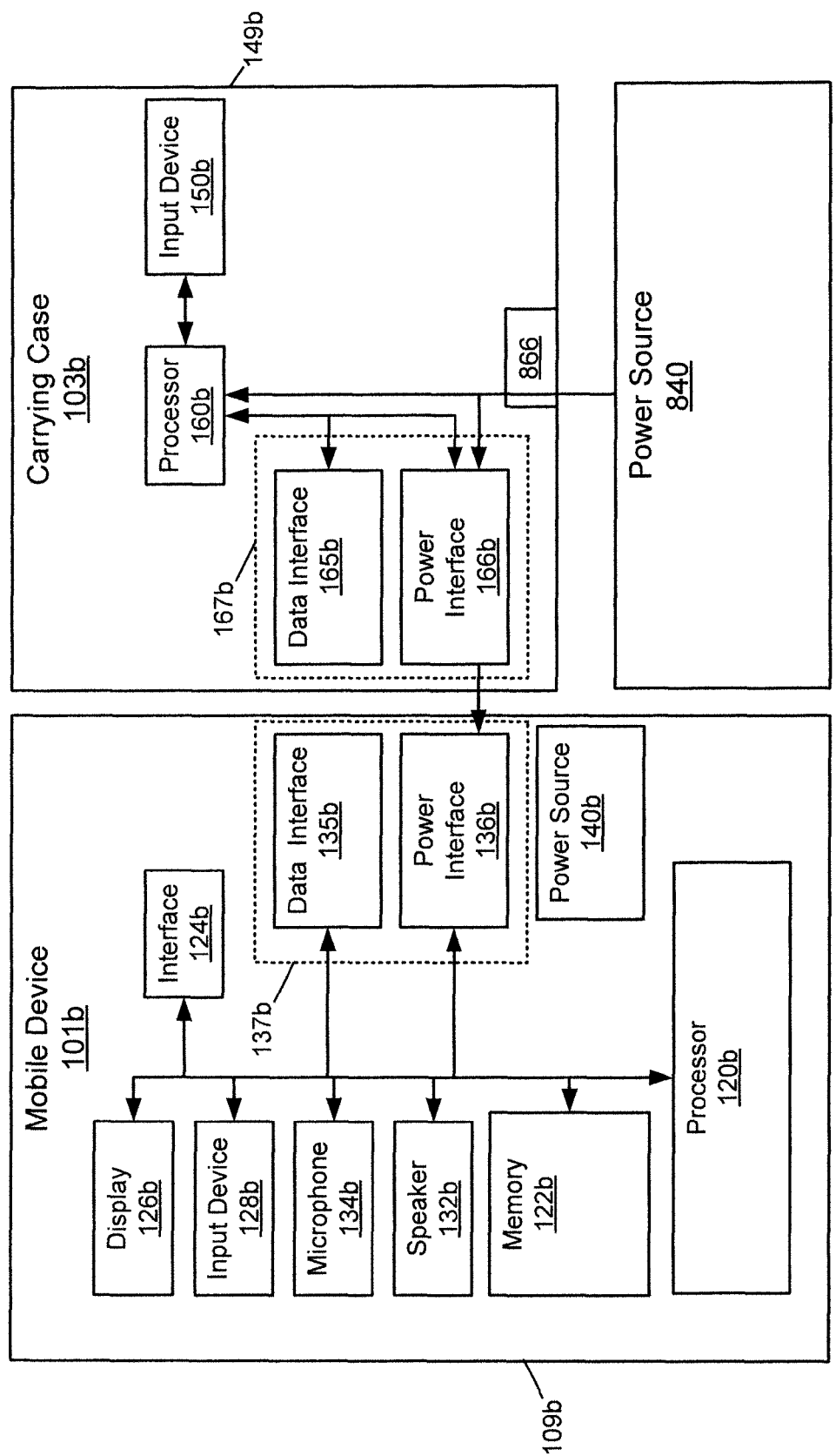
FIG. 9 depicts a schematic block diagram of a system including an alternative carrying case device for controlling a mobile device and an external power source used to power the alternative carrying case and the mobile device, according to non-limiting implementations.

Attention is next directed to FIGS. 8 and 9 which depict a schematic diagram of an alternative system 100b, according to non-limiting implementations. System 100b is substantially similar to system 100, with like elements having like numbers, however with a "b" appended thereto. System 100b hence comprises a mobile device 101b and a carrying case 103b for controlling mobile device 101b. Mobile device 101b comprises a housing 109b, which houses a processor 120b interconnected with a memory 122b, a communications interface 124b, a display 126b, an input device 128b, a speaker 132b, a microphone 134b, a data interface 135b and a power interface 136b (combined in an optional unified interface 137b), and a power source 140b. Communications interface 124b will be interchangeably referred to as interface 124b. Carrying case 103b comprises a body 149b housing a processor 160b interconnected with at least one input device 150b, and a data interface 165b and a power interface 166b (combined in an optional unified interface 167b).

However, in contrast to carrying case 103, carrying case 103b further comprises a second power interface 866 enabled to receive power from an external power source 840 for powering processor 160b. For example, external power source 840 can comprise one or more of a battery, and external battery pack, an AC-to-DC (alternating current to direct current) converter, a connection to a mains power supply and the like. Hence, second power interface 866 can comprise any suitable connector for connecting the external power source 840 including, but not limited to, a barrel connector; it is appreciated that, while not depicted, external power source 840 comprises a complementary power interface enabled for connection to power interface 866.

It is presumed in FIGS. 8 and 9 that, when power interface 866 is initially connected to external power source 840, power interface 166b is receiving power from mobile device 101b via power interface 136b, as described above.

However, when power interface 866 is connected to external power source 840, processor 160b receives power from external power source 840 and determines that power is being received from power interface 866. In response, processor 160b can transmit a message to mobile device 101b (e.g. via data interfaces 135b, 165b) to cause power from mobile device 101b to carrying case 103b to be turned off, thereby conserving power at power source 140b, which can be particularly useful when system 100b is being used for gaming applications, which can be power intensive, and/or any other power intensive applications.

In some alternative implementations, as depicted in FIG. 9, processor 160b can further transmit a message to mobile device 101b via data interfaces 135b, 165b to cause mobile device 101b to prepare to receive power from carrying case 103b. Carrying case 103b switches to a mode where power from second power interface 866 is relayed to power interface 166b (e.g. via a suitable circuit, switch and the like (not depicted), which can be controlled by processor 160b), which is in turn relayed to mobile device 101b via power interface 136b (as indicated by the arrow from power interface 166b to power interface 136b) such that mobile device 101b can also be powered from power source 840. Hence, power at power source 140b can be conserved, which can be particularly useful when system 100b is being used for gaming applications, which can be power intensive, and/or any other power intensive applications.

Hence, in these implementations, carrying case 103b further comprises second power interface 866 enabled to receive power from external power source 840 for powering processor 160b. Second power interface 866 can be further enabled to relay the power to mobile device 101b when second power interface 866 is connected to external power source 840. Power from external power source 840 can be optionally relayed to mobile device 101*b* via power interface 166*b*.

Figure 10:
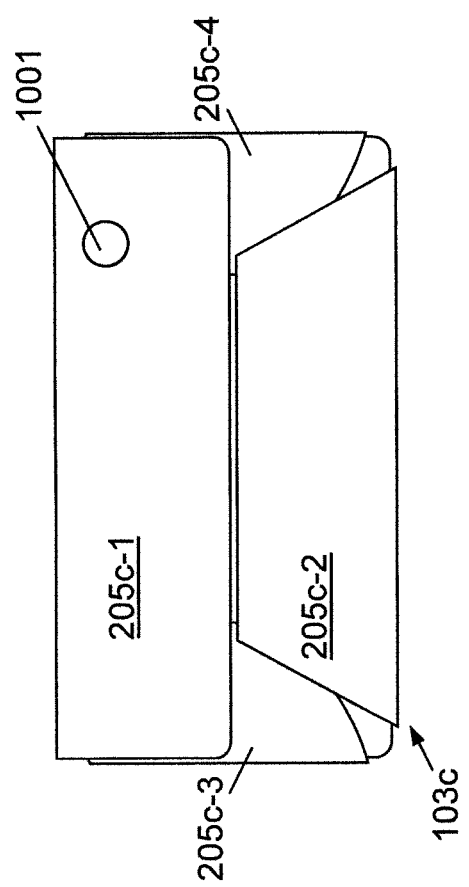
FIG. 10 depicts a front perspective view of an alternative implementation of a carrying case mated to a mobile device, where the carrying case comprises a notification device exposed when the carrying case in a closed position, according to non-limiting implementations.

Attention is next directed to FIG. 10, which depicts a front perspective view of an alternative carrying case 103*c* mated with mobile device 101, according to non-limiting implementations; as carrying case 103*c* is in a closed position, mobile device 101 (encased therein) is not visible, but is appreciated to be nonetheless present. Carrying case 103*c* is substantially similar to carrying case 103 with like elements having like numbers, however with a "c" appended thereto. Carrying case 103*c* comprises four flaps 205*c*-1, 205*c*-2, 205*c*-3, 205*c*-4 (referred to interchangeably hereafter collectively as flaps 205*c* and generically as a flap 205*c*), While not depicted, it is further appreciated that carrying case 103*c* comprises at least one input device, a processor, a data interface, and a power interface respectively similar to at least one input device 150, processor 160, data interface 165 and power interface 166; further carrying case 103*c* can comprise magnets, similar to magnets 209. However, in these implementations, carrying case 103*c* further comprises a notification device 1001 enabled to provide notifications of events at mobile device 101 when mated thereto. Hence, notification device 1001 is located on one of flaps 205*c* such that notification device 1001 is exposed when flaps 205*c* are closed. Notification device 1001 can include, but is not limited to, a light, a light emitting diode (LED), a display, an LCD (liquid crystal display), an OLED (organic LED) display and/or indicator, and the like.

Further, notification device 1001 can be powered via the mated power interfaces of each of carrying case 103*c* and mobile device 101, and controlled via the mated data interfaces of carrying case 103*c* and mobile device 101. For example, notification device 1001 can provide notifications of events that occur at mobile device 101 when notification devices at mobile device 101 are hidden within carrying case 103*c*. For example, when mobile device 101 is encased by carrying case 103*c* and a message arrives at mobile device 101 (e.g. via interface 124), mobile device 101 can cause notification device 1001 to provide a notification of the message (e.g. notification device 1001 can blink).

Heretofore, carrying cases comprising flaps have been described, however present implementations are not so limited. For example, attention is next directed to FIG. 11 which depicts a front perspective view of a mobile device 101*d* being received at a carrying case 103*d*. In general, mobile device 101*d* is substantially similar to mobile device 101*d*, except that a unified interface 137*d* (comprising a combined data interface and power interface, respectively similar to data interface 135 and power interface 136) is located on a bottom of mobile device 101*d*. Similarly, carrying case 103*d* is similar to carrying case 103, except that a body 149*d* of carrying case 103 comprises a shell, rather than a receptacle and flaps. Hence, carrying case 103*d* is enabled to receive mobile device 101*d* via an aperture (not visible in FIG. 11) in body 149*d* (e.g. along a top of body 149*d*), as indicated by arrow 1101. The aperture in body 149*d* can optionally be closable via a flap and the like.

Figure 11:
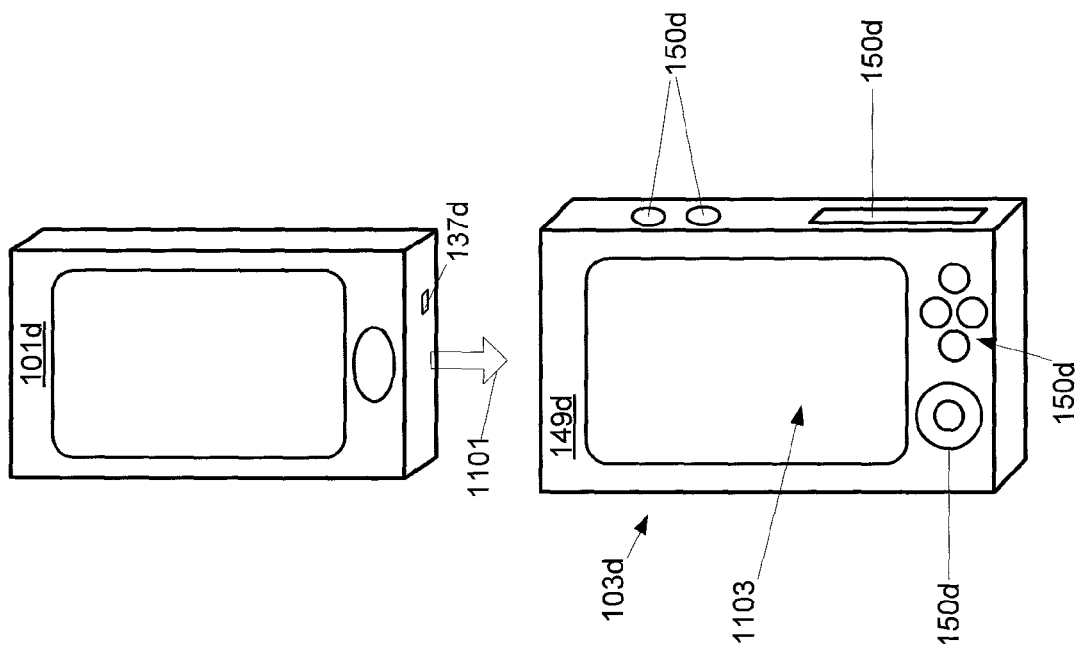
FIG. 11 depicts a front perspective view of a mobile device being received at a carrying case, according to non-limiting implementations.

While not visible in FIG. 11, it is further appreciated that carrying case 103*d* comprises a data interface and a power interface (e.g. combined in a unified interface) at an interior surface of carrying case 103*d* for mating with unified interface 137*d*.

Further, body 149*d* can comprise a hardshell, a softshell and/or a combination. Further, body 149*d* comprises an aperture 1103 through which a display of mobile device 101*d* is exposed when mobile device 101*d* is received in carrying case 103*d*.

In any event, carrying case 103*d* comprises at least one input device 150*d*, similar to input device(s) 150 described above, disposed on an exterior of body 149*d*. While not depicted, it is appreciated that carrying case 103*d* further comprises a processor similar to processor 120 and that carrying case 103*d* otherwise functions as one or more of carrying cases 103, 103*a*, 103*b*, 103*c*. Rather, only the form factor of carrying case 103*d* differs from previously described carrying cases 103, 103*a*, 103*b*, 103*c*.

Persons skilled in the art will appreciate that there are yet more alternative implementations and modifications possible. For example, processor 120 at mobile devices 101 can be enabled to remove virtual input devices from displays 126, when carrying case 103 is mated thereto. For example, when display 126 comprises a touch screen device, and an application having touch screen controls is provided at display 126 (e.g. virtual buttons, virtual input devices, and the like), processor 120 can determine that carrying case 103 is mated thereto and one or more of remove virtual input devices from display 126 and/or not render virtual input devices at display 126; rather, input device(s) 150 can be used to control the application. Indeed, by removing and/or not rendering the virtual input devices, a full viewing space of display 126 can be used for content of the applications and not the virtual input devices. For example, in gaming applications, virtual controls for running, jumping, shooting, accessing inventory lists, and the like can be removed from display 126 and the entirety of display 126 can be devoted to, for example, a point-of-view (POD) rendering of a gaming landscape. This can be especially useful on mobile hand held devices where the displays can have about a 5 inch diagonal or less.

Indeed as input devices are integrated into the present carrying case, which can be enabled to be hand-held, the input devices at the carrying case can be used without explicit use of a table, and with minimal weight and/or space requirements.

Hence, provided herein are various implementations of a carrying case, the carrying case comprising at least one or more input devices that can be used to control a mated mobile device. The mobile device can initially power a processor at the carrying case via a data interface, which can trigger the mobile device to enter a master mode and power the carrying case over a power interface, for example, when the interfaces comprise a micro-USB connector. Once powered, the carrying case can then be used to control applications at the mobile device via the data interface and input devices located at carrying case. The carrying case can be particularly useful for gaming applications, as game play can be rapid, involving rapid actuation of input devices for which the input devices of a mobile device may not be suitable. It is further appreciated that carrying cases as described herein are distinguishable from carrying cases comprises keyboards, which generally do not have the same input speed requirements as input devices for gaming applications. For example, data interfaces as described herein are generally faster than keyboard interfaces.

It is further appreciated that the carrying case and associated input devices, also provides a convenient receptacle for holding/interacting with a mobile device, for example during game play. While standalone gaming peripherals (e.g. joysticks and the like) can be used with a mobile device, such peripherals must be specially attached to the mobile device when an application is being processed, and are hence generally carried separately, which is inconvenient. By combining the input device with the carrying case, a convenient and compact method of carrying gaming peripherals and/or other input devices, is also provided. Further, when the carrying case comprises a holster, a shell and the like, the form factor of the input devices at the carrying case is such that the carrying case and input devices, together, fit in the hand of a user for easy transportation.

Further advantages of carrying cases described herein include, but are not limited to: versatility in providing input to a mated mobile device, adaptability to a variety of mobile devices, combined functionality as a physical protector and mobile device controller, compactness, light weight (such that carrying case is portable, thereby supporting handheld implementations and aiding mobility and portability), efficiency, robustness, and enhancing the functionality of a mobile device mated thereto without detracting from other functions of the mobile device.

Those skilled in the art will appreciate that in some implementations, the functionality of mobile device 101 and carrying cases 103, 103a, 103b, 103c, 103d, and mobile devices 101, 101b can be implemented using pre-programmed hardware or firmware elements (e.g., application specific integrated circuits (ASICs), electrically erasable programmable read-only memories (EEPROMs), etc.), or other related components. In other implementations, the functionality of mobile device 101 and carrying cases 103, 103a, 103b, 103c, 103d, and mobile devices 101, 101b can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A carrying case comprising:
   a body enabled to mate with a mobile device to physically protect the mobile device;
   three or more flaps that open outwards from the body, two flaps, of the three or more flaps, located on opposite sides of the body, at least three, of the three or more flaps, comprising respective input devices proximal the body;
   a processor enabled to control communications with the mobile device;
   a power interface enabled to receive power from the mobile device to power the processor; and,
   a data interface enabled for relaying the communications between one or more of the respective input devices and the processor, and the mobile device, for controlling applications at the mobile device.

2. The carrying case of claim 1, further comprising a unified interface comprising the power interface and the data interface.

3. The carrying case of claim 2, wherein the unified interface comprises one or more of a USB (Universal Serial Bus) interface and a micro-USB interface.

4. The carrying case of claim 2, the unified interface comprises a micro-USB interface and input data is relayed from the respective input devices to the mobile device via one or more of a data+ pin, a data− pin and an ID (identifier) pin.

5. The carrying case of claim 1, wherein the processor is further enabled to initially be powered by a data contact of the data interface during initiation of the communications between the processor and the mobile device, and then be powered via the power interface once the communications are established between the processor and the mobile device.

6. The carrying case of claim 1, wherein the processor is further enabled to cause the mobile device to operate in a master mode, while the processor is enabled to operate in a slave mode.

7. The carrying case of claim 1, further comprising a second power interface enabled to receive power from an external power source for powering the processor.

8. The carrying case of claim 7, wherein the second power interface is further enabled to relay the power to the mobile device when the second power interface is connected to the external power source.

9. The carrying case of claim 8, wherein the power from the external power source is relayed to the mobile device via the power interface.

10. The carrying case of claim 1, wherein the power interface comprises an NFC (near field communication) interface.

11. The carrying case of claim 1, wherein the respective input devices each comprise one or more of a joystick, a touch slider, a touch dial, and a touch push button.

12. The carrying case of claim 1, wherein the body comprises at least one receptacle for receiving and holding the mobile device.

13. The carrying case of claim 12, wherein the power interface and the data interface are located in the at least one receptacle such that, when the mobile device is received therein, the power interface mates with a corresponding power interface at the mobile device and the data interface mates with a corresponding data interface at the mobile device.

14. The carrying case of claim 1, wherein the three or more flaps are configured to encase the mobile device when the three or more flaps are in a closed position.

15. The carrying case of claim 1, wherein the respective input devices are exposed when the three or more flaps are in an open position, and the respective input devices are hidden when the three or more flaps are in the closed position.

16. The carrying case of claim 1, wherein a portion of the three or more flaps are configured as a stand to support the mobile device in a semi-upright position.

17. The carrying case of claim 1, further comprising one or more of a soft case, a hard case and a combined hard and soft case.

18. The carrying case of claim 1, further comprising one or more of a holster, a binder, a folio, a folio case, a folio hardshell, a shell, a hardshell, a softshell, a cover, a soft case, a hard case and a stand.

19. The carrying case of claim 1, further comprising a notification device enabled to provide notifications of events at the mobile device when mated thereto.

* * * * *